United States Patent [19]

Callum

[11] Patent Number: 5,492,386
[45] Date of Patent: Feb. 20, 1996

[54] FLEXIBLE SEATING ARRANGEMENT FOR A MINI VAN

[75] Inventor: Stuart M. Callum, Turin, Italy

[73] Assignee: Ford Motor Company, Dearborn, Mich.

[21] Appl. No.: 237,811

[22] Filed: May 4, 1994

[51] Int. Cl.⁶ ........................................ B60N 2/36
[52] U.S. Cl. .................. 296/64; 296/65.1; 296/69; 297/15; 297/236; 297/335
[58] Field of Search ................ 296/63, 64, 65.1, 296/66, 69; 297/15, 235, 236, 243, 335, 336

[56] References Cited

U.S. PATENT DOCUMENTS

| | | | |
|---|---|---|---|
| 2,589,922 | 3/1952 | Bowman | 296/65.1 |
| 3,151,906 | 12/1962 | Roberts | 296/66 |
| 3,165,351 | 1/1965 | Clancy et al. | 296/65.1 |
| 4,341,415 | 7/1982 | Braun | 296/65.1 |
| 4,699,418 | 10/1987 | Plavetich | 296/65.1 |
| 4,779,917 | 10/1988 | Campbell | 296/65.1 |
| 4,932,709 | 6/1990 | Wainwright | 296/65.1 |
| 4,957,321 | 9/1990 | Martin et al. | 296/65.1 |
| 5,104,176 | 4/1992 | Mrozowski | 296/65.1 |
| 5,116,097 | 5/1992 | Bulgari | 296/64 |
| 5,224,750 | 7/1993 | Clark et al. | 296/65.1 |

FOREIGN PATENT DOCUMENTS

| | | | |
|---|---|---|---|
| 2604958 | 4/1988 | France | 296/69 |
| 1947173 | 4/1979 | Germany | 296/66 |
| 2843667 | 4/1980 | Germany | 297/15 |
| 5867528 | 4/1983 | Japan | 297/257 |
| 2009592 | 6/1979 | United Kingdom | 297/335 |

Primary Examiner—Dennis H. Pedder
Attorney, Agent, or Firm—Roger L. May; Gregory P. Brown

[57] ABSTRACT

A flexible seat arrangement is described for a use in a motor vehicle. The seat arrangement includes three rows of seats which can be configured into at least five various configurations, presenting unique seating and payload carrying capabilities.

7 Claims, 8 Drawing Sheets

FLEXIBLE SEATING ARRANGEMENT FOR A MINI VAN

BACKGROUND OF THE INVENTION

1. Field of the Invention

The present invention relates to an arrangement of seats within a passenger van. More particularly, the present invention relates to an arrangement of vehicle seats capable of providing several possible seating and cargo loading configurations.

2. Disclosure Information

In a vehicle, it is often desirable to provide a forwardly foldable seating assembly for increasing the cargo carrying capacity of the vehicle. In vehicles, particularly of the mini-van type having at least three rows of seats, it is further desirable to have the rearmost two seats fold forwardly for carrying large cargo other than people.

U.S. Pat. No. 4,932,709 discloses mini-van seating arrangement including a forwardly folding and pivoting seat assembly adapted to provide a single loading surface for increased cargo carrying capacity. The seat back of the third row seat assembly folds forwardly, and the seat cushion pivots forward from its forward edge, placing the folded seat assembly behind the second row seat assembly, thereby presenting the under side of the seat cushion as a co-planar extension of the rear load floor. This load floor may be further extended by folding the seat assembly seat back forward. Simultaneously, a kinematic second row seat base lowers the second row folded seat back into the plane of the loading platform. Together, this seating arrangement provides an expandable load platform co-planar with the rear load platform. However, the arrangement described does not provide flexibility for both passenger comfort while accommodating various payload configurations.

It would be desirable to provide a seating arrangement capable of providing multiple loading platforms in multiple loading planes. It would be further desirable to provide a seating arrangement capable of presenting multiple loading platforms without the use of kinematic seat base mechanisms. Finally, it would be desirable to provide a seating arrangement capable of providing multiple loading platforms and adjustable leg room for all passenger seats.

SUMMARY OF THE INVENTION

The present invention advances beyond the systems described above by providing a seat arrangement for use in a motor vehicle having a longitudinal and a transverse axis. In a motor vehicle including a first floor being raised over a rear axle of the motor vehicle and a second floor forward of the first floor, the seating arrangement comprises right and left seat tracks disposed on the second floor parallel to the longitudinal axis of the vehicle. The seating apparatus further includes a slidable seat riser including right and left support members slidably engaged in the right and left seat tracks, respectively, and a transverse member interconnecting the support members. Also included in the seating arrangement is a kickup interposed between the second floor and the first floor. The kickup has a lower edge contacting a rearward edge of the second floor and an upper edge contacting the forward edge of the first floor. The seating arrangement further includes a first row of seats having a driver's and a navigator's seat disposed on the second floor. The navigator's seat is of a forwardly folding type and has a first seat back having one face covered by a first loading surface.

A second row of seats is disposed immediately rearward of the first row of seats on the seat riser. The second row of seats are also of the forwardly folding type having a second seat back having one face covered by a second seat back loading surface. The second row of seats further include a second seat base having a second forward edge being hingedly fastened to the riser, and one face covered by a second seat cushion loading surface.

There is a third row of seats is disposed immediately rearward of the second row of seats on the raised first floor. The third row of seats are also of the forwardly folding type having a third seat back having one face covered by a third seat back loading surface. The third row of seats further include a third seat base having one face covered by a third seat cushion loading surface and a third forward edge being hingedly fastened to the upper edge of said kickup.

It is an advantage of the present invention to provide an a simple, flexible seating arrangement capable of being arranged into a variety of passenger seating and payload carrying configurations having more than a single loading plane.

Other objects, features and advantages of the present invention will become apparent to those skilled in the art from the drawings, detailed description and claims which follow.

DETAILED DESCRIPTION OF THE PREFERRED EMBODIMENT

Figure 1:
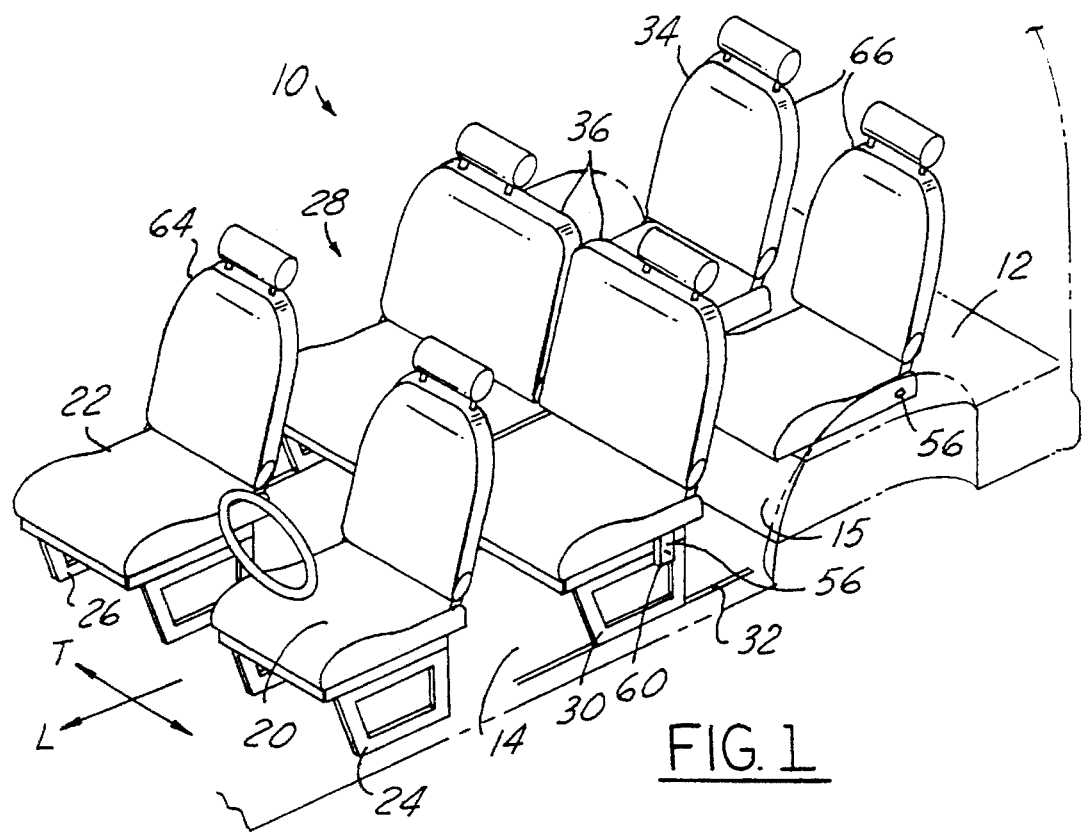
FIG. 1 is a perspective view of a motor vehicle including a flexible seating arrangement in accordance with the present invention arranged to seat a maximum number of passengers.
Figure 2:
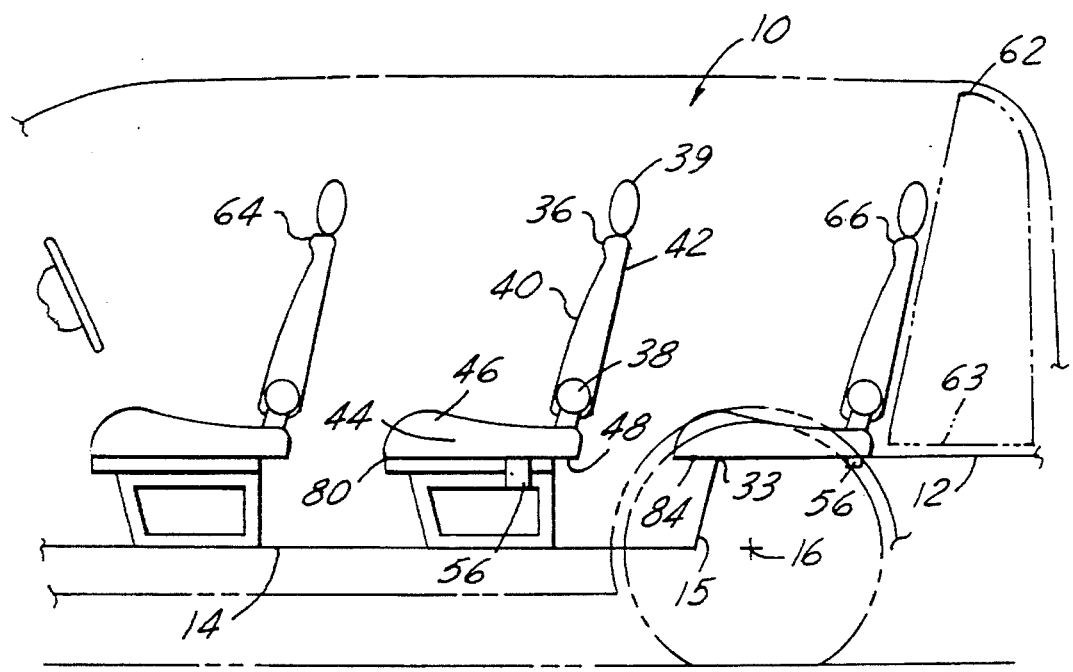
FIG. 2 is an elevational view of a motor vehicle including a flexible seating arrangement in accordance with the present invention arranged as described in FIG. 1.

Turning now to the Figures, FIGS. 1 and 2 illustrate a motor vehicle passenger compartment 10 having a longitudinal axis indicated by L and a transverse axis indicated by T. The passenger compartment includes a first and second floor generally indicated at 12 and 14 respectively. The first floor 12 is raised over a rear axle 16 and extends rearwardly therefrom. The second floor 14 extends forward of the rear axle 14 and is lower in height relative to the raised first floor 12. A kickup 15 interconnects the first and second floors 12, 14. The lower height of the second floor 14 reduces the height to step into the vehicle for improved passenger ingress and egress, while the raised first floor provides necessary clearance for the rear axle 16.

The passenger compartment 10 further includes three rows of passenger seats. The first row of seats consists of a driver's seat 20 and a navigator's seat 22. First row seat risers 24, 26 support the first row seats 20, 22 and secure each to the first floor. The second row of seats, disposed immediately rearward of the first row of seats, includes a second seat assembly 28 disposed on a second row seat riser 30. The second row seat riser 30 slidably engages a seat track 32 disposed on first floor 14. The third row of seats, disposed immediately behind the second seat assembly 28, includes a third seat assembly 34 disposed directly at a forward edge 33 of the first floor 12.

Referring to FIG. 2, the second seat assembly 28 will now be described, however, it should be understood that each of the seats in the passenger compartment 10 are of common design, except were otherwise provided. The second seat assembly 28 is generally of the forwardly folding type and includes a second seat back 36, extending upward from a recliner mechanism 38, as is commonly known to those skilled in the reclining seat arts. A forward folding head rest 39 is disposed on the upper end of the second seat back 36. The second seat back 36 includes a forward face having disposed thereon a second seat back cushion 40 and on the opposite face a second seat back loading surface 42. The second seat assembly 28 further includes a second seat base 44 including on one face a second seat cushion 46 and on an opposite face a second seat cushion loading surface 48. The second row seat base of the present embodiment further includes a second hinged fastener 80.

The loading surfaces of each of the seat assemblies is preferably constructed from a substantially rigid synthetic polymeric material, such as polypropylene.

Figure 3:
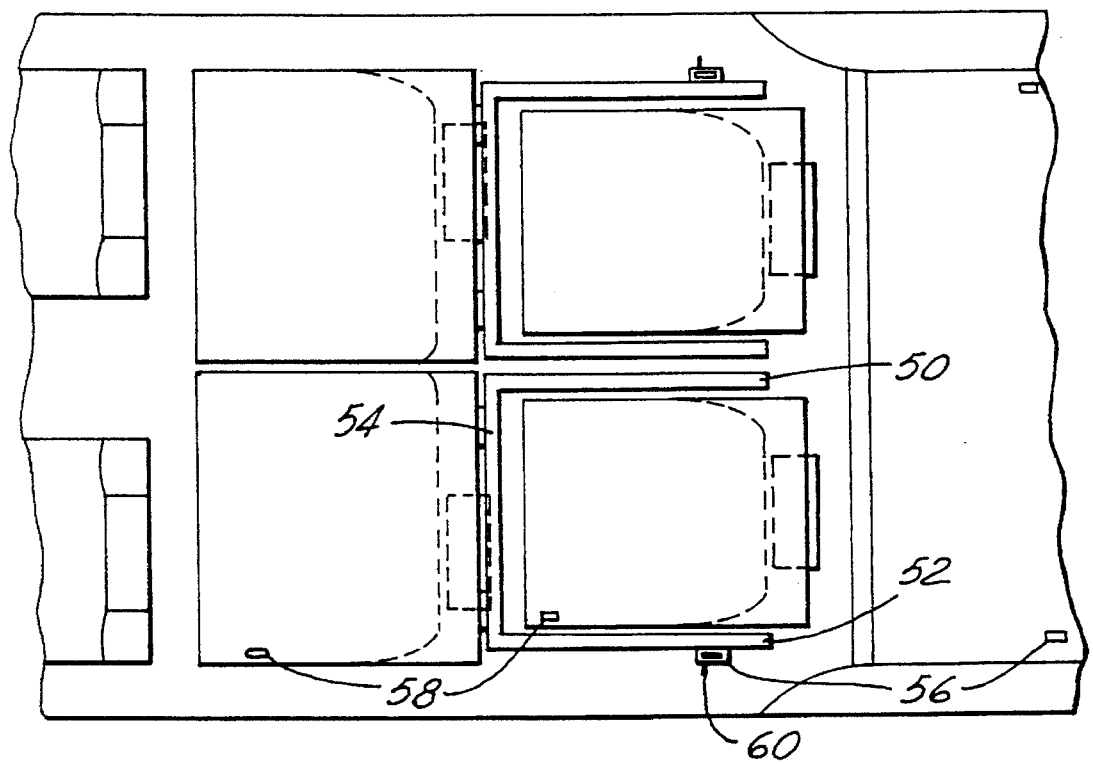
FIG. 3 is a plan view of a motor vehicle including a flexible seating arrangement in accordance with the present invention illustrating the seat risers of the second row of seats.

Referring now to FIGS. 1–3, second row seat riser 30 includes right and left support members 50, 52 and a transverse member 54 disposed between the upper, forward ends of support members 50, 52. The present invention contemplates either a single second row seat riser 30, with a transverse member 54 spanning the width of the vehicle, or, as shown in FIG. 3, or multiple second row seat risers 30, permitting greater seating variations within the passenger compartment 10. The left and right support members 50, 52 are of a fixed height, preferably equal to the height of the first floor 12. Support members 50, 52 are disposed within seat tracks 32, such as are commonly known in the automotive seating arts. There is a separate seat track for each support member. The seat tracks are preferably flush mounted within the second floor 14 and extend substantially between the first row of seats 22 and the third row of seats 34. In general the support members 50, 52 and their respective seat tracks are substantially parallel to the longitudinal axis of the motor vehicle.

As can be seen in FIGS. 1–3, a latch mechanism 56 and striker 58 may be disposed on the support member 50 and recessed in the second floor 12 as is commonly known to those skilled in the automotive seating arts for positively retaining the second and third assemblies 28, 34 in the seating position. The mechanisms 56 may be released with a release tab 60, or a linkage may be provided to release mechanism 56 when the headrest 39 is tilted forward.

The true advantage of the present invention becomes apparent upon carefully considering its wide variety of configurations. The present invention advantageously combines conventional seating apparatus to provide surprisingly flexible seating and payload carrying capability for a motor vehicle, without requiring the removal and storage of the seat assemblies. Five of the most useful configurations will now be described, however, it is understood that various other combinations are possible.

FIGS. 1–2 illustrate a first seating configuration, providing maximum passenger seating, and a first payload area 62. The first seating configuration is obtained by orienting the first, second and third row of seats 22, 28, 34 with their respective seat backs 64, 36, 66 positioned in an upright passenger seating position. The second row seat riser 30 conveniently permits forward and rearward adjustment of the second row seat assembly 28, providing variable leg room for both second and third row passengers.

Figure 5:
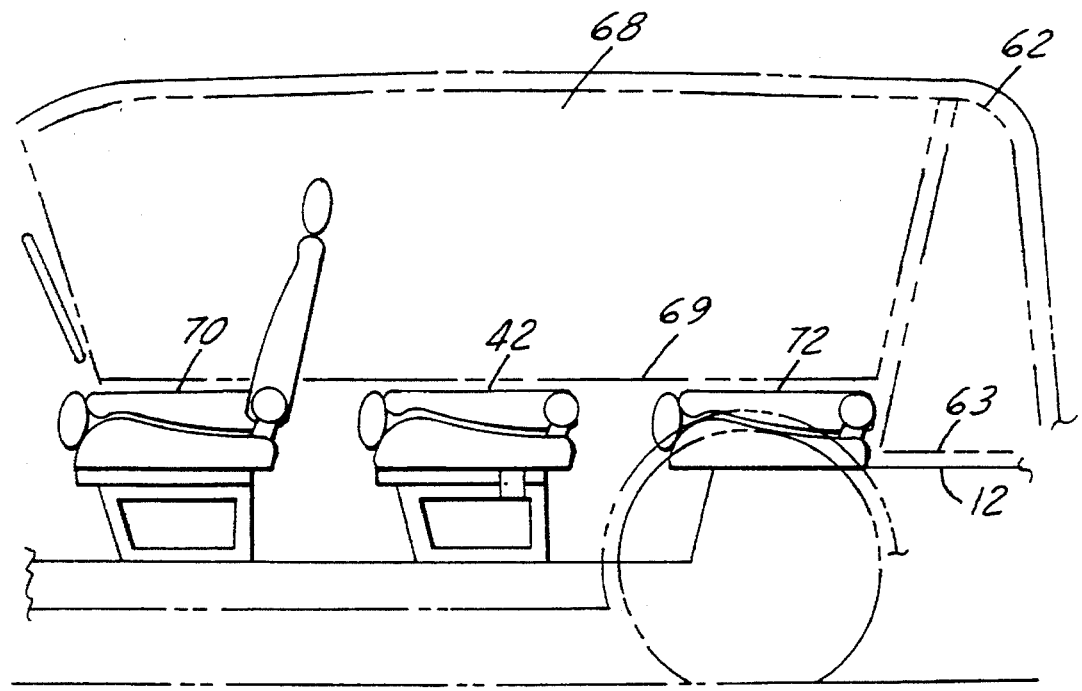
FIG. 5 is an elevational view of a motor vehicle including a flexible seating arrangement in accordance with the present invention arranged to present a second seating configuration.
Figure 4:
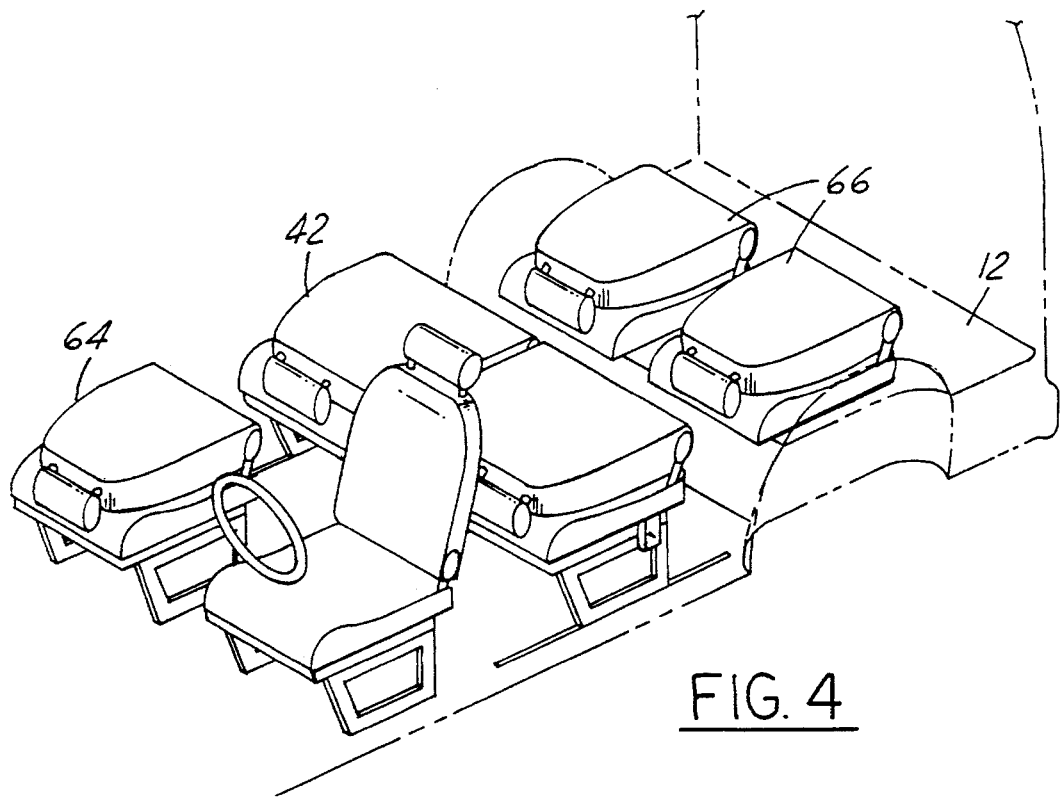
FIG. 4 is perspective view of a motor vehicle including a flexible seating arrangement in accordance with the present invention arranged to present a second seating configuration.
Figure 6:
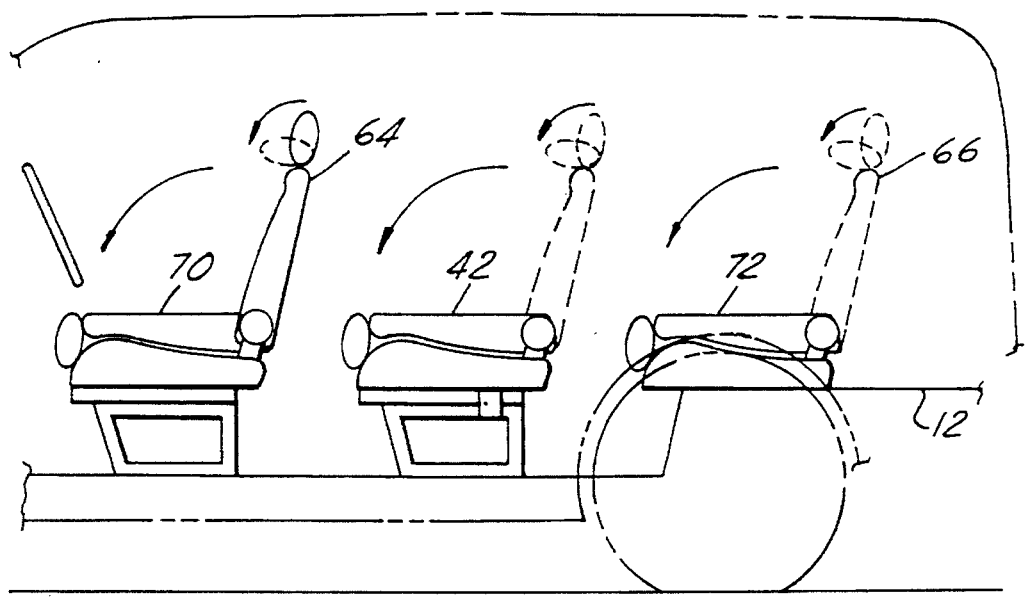
FIG. 6 is an elevational view of a motor vehicle including a flexible seating arrangement in accordance with the present invention being arranged to present a second seating configuration.

FIGS. 4–6 illustrate a second seating configuration, which provides two loading platforms lying in separate planes. By folding the seat backs of the navigator 22, second 28 and third 34 seats forward to a first folded position, a second payload area 68 is presented. A second load platform 69 of the second payload area 68 is co-planar with the navigator seat back loading surface 70, the second seat back loading surface 42 and the third seat back loading surface 72. The second load platform 69 of the second payload area 68 is raised above the first load platform 63 of the first payload area 62. This unique configuration permits carrying extra long cargo that extends from the navigator seat back loading surface 70 to the rear of the vehicle.

Figure 7:
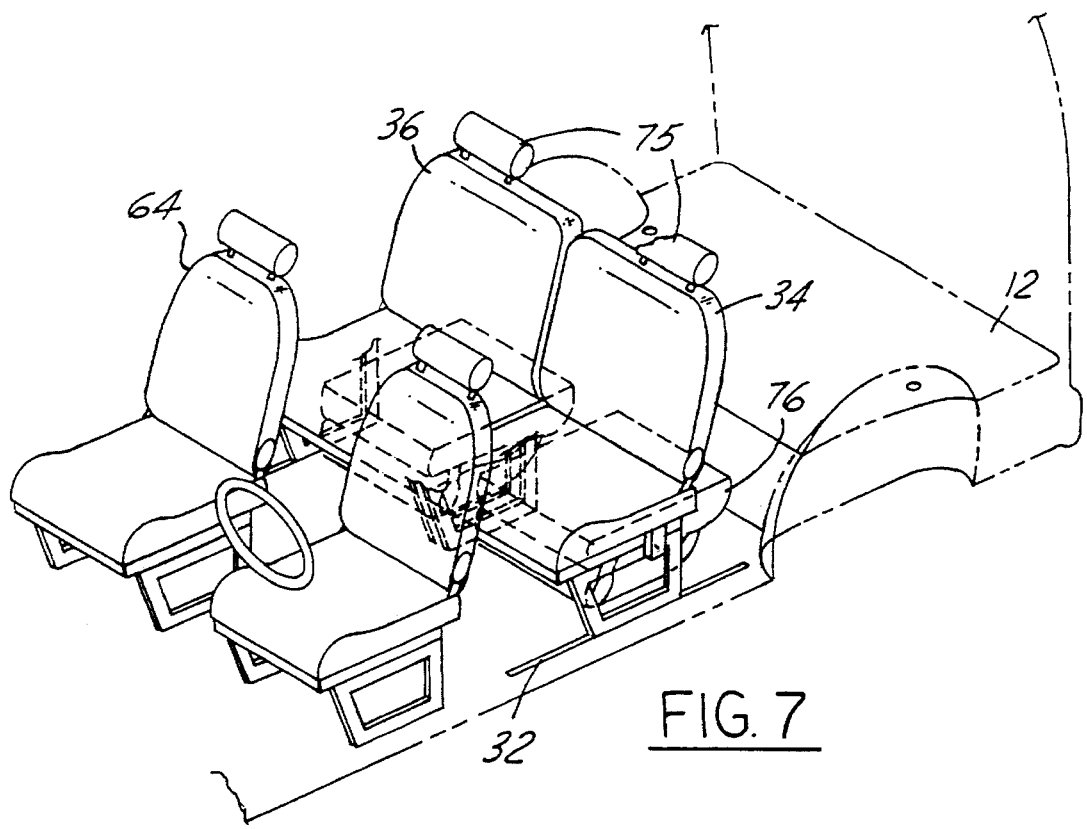
FIG. 7 is a perspective view of a motor vehicle including a flexible seating arrangement in accordance with the present invention arranged to present a third seating configuration.
Figure 9:
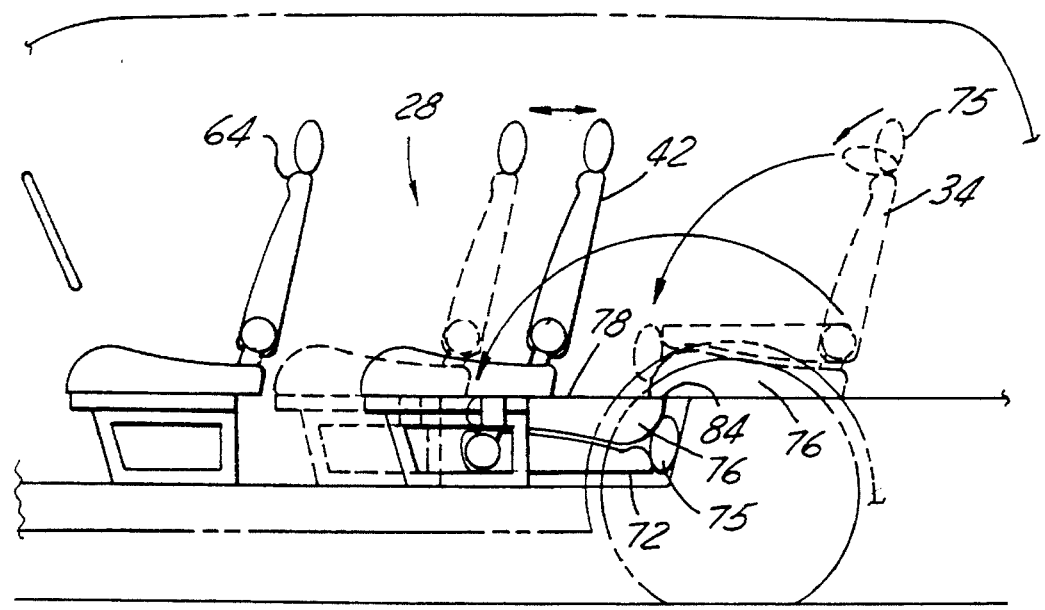
FIG. 9 is an elevational view of a motor vehicle including a flexible seating arrangement in accordance with the present invention being arranged to present a third seating configuration.
Figure 8:
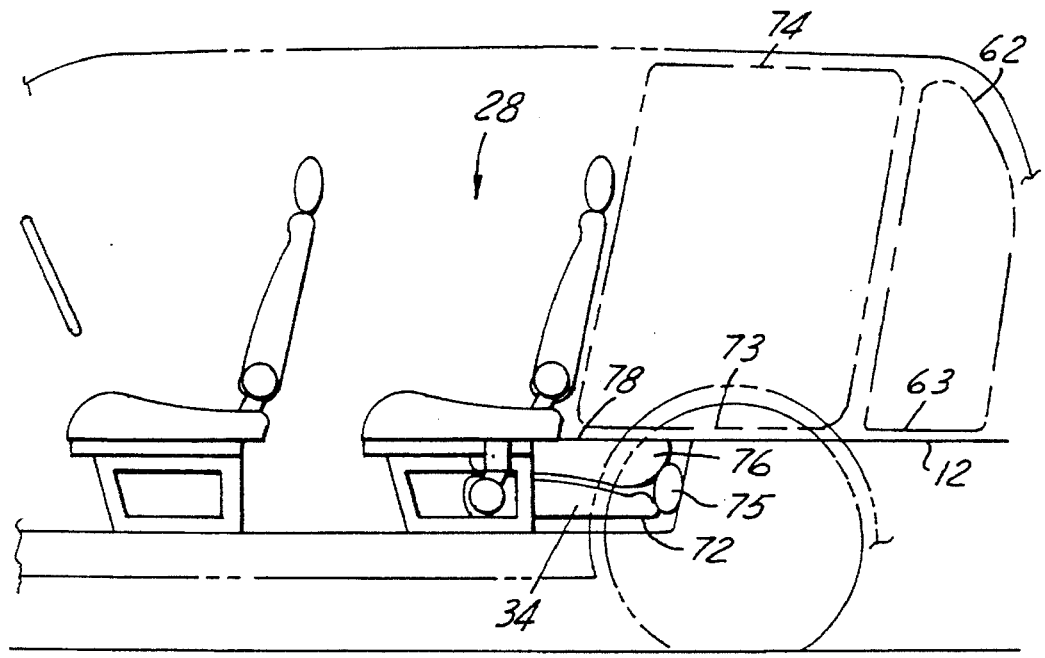
FIG. 8 is an elevational view of a motor vehicle including a flexible seating arrangement in accordance with the present invention arranged to present a third seating configuration.
Figure 11:
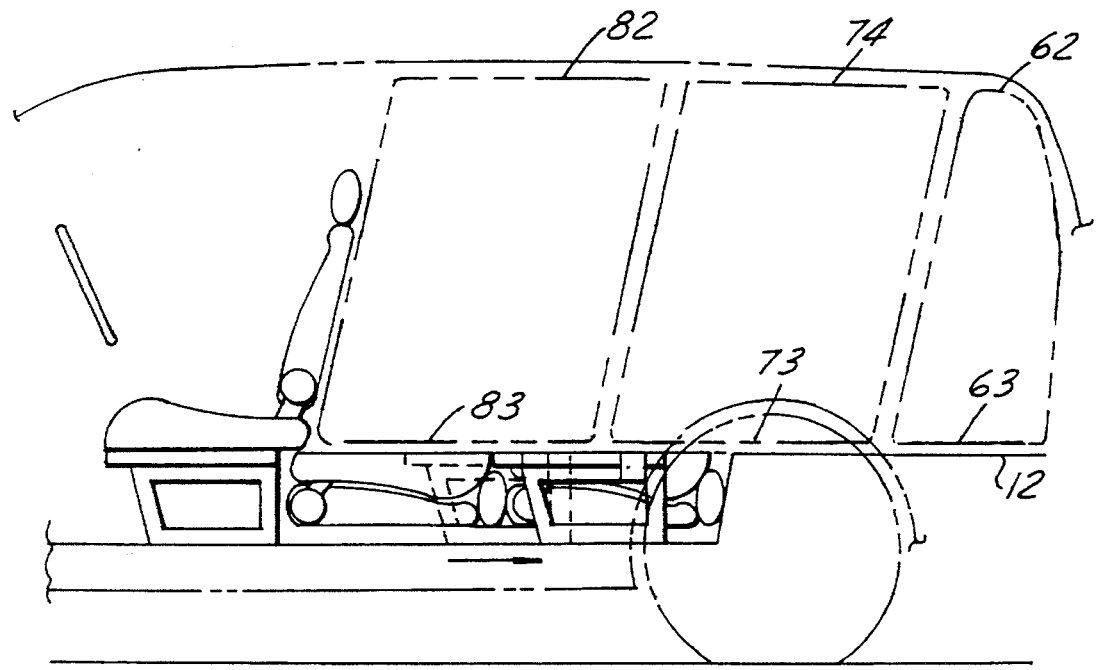
FIG. 11 is an elevational view of a motor vehicle including a flexible seating arrangement in accordance with the present invention arranged to present a fourth seating configuration.
Figure 10:
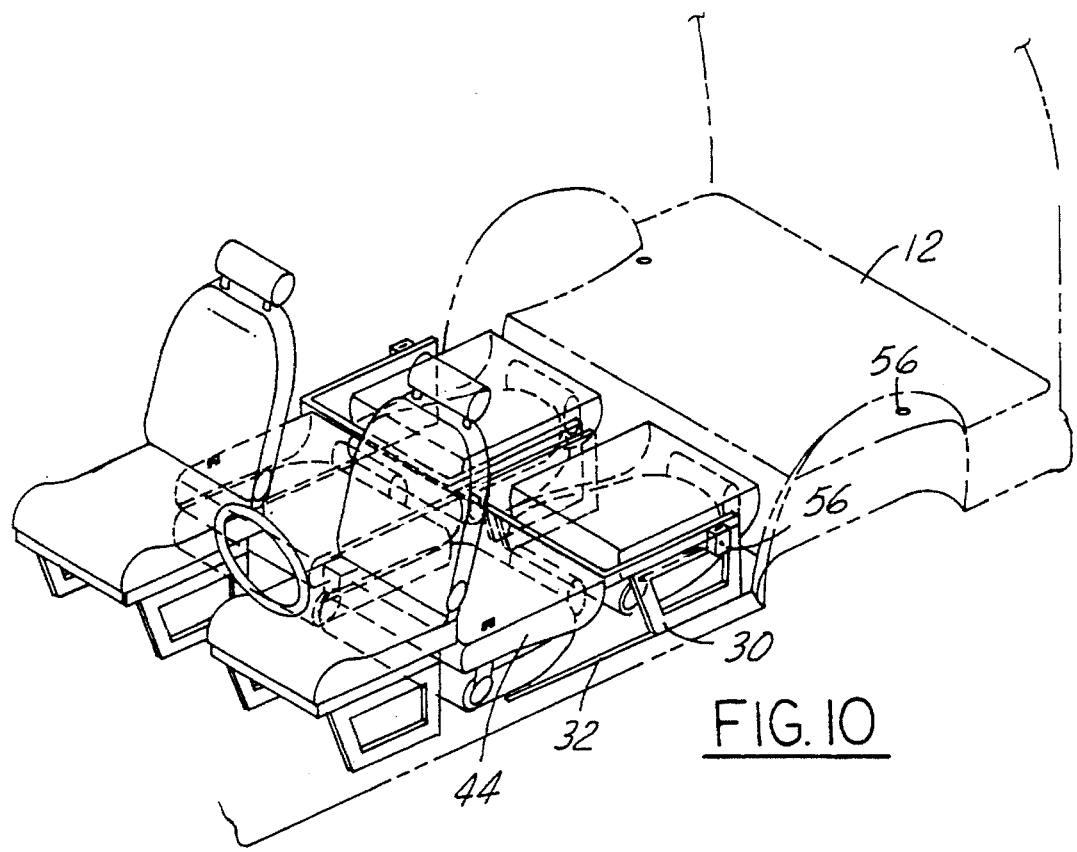
FIG. 10 is a perspective view of a motor vehicle including a flexible seating arrangement in accordance with the present invention arranged to present a fourth seating configuration.
Figure 12:
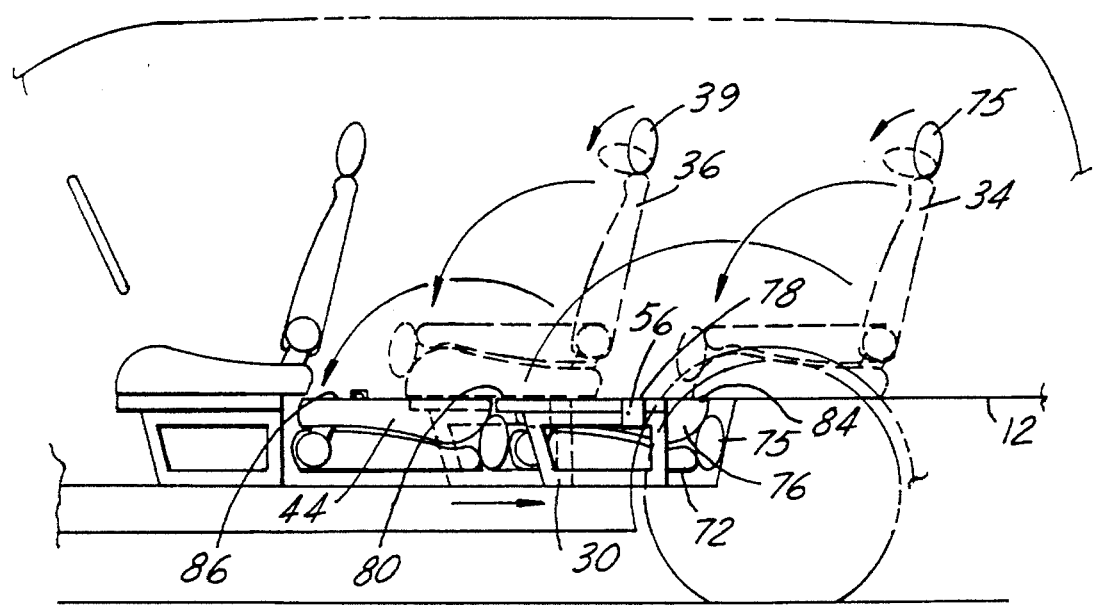
FIG. 12 is an elevational view of a motor vehicle including a flexible seating arrangement in accordance with the present invention being arranged to present a fourth seating configuration.
Figure 13:
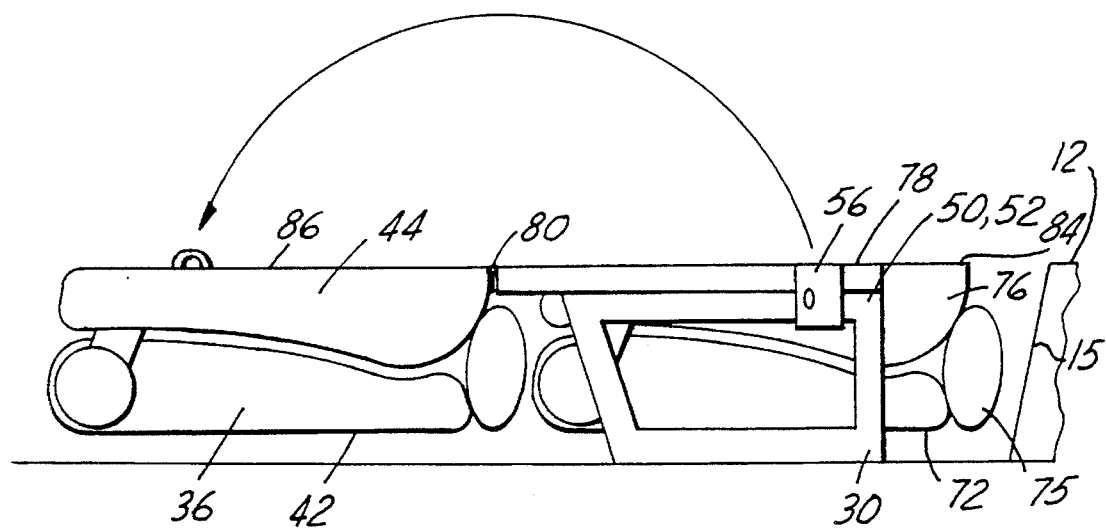
FIG. 13 is an elevational view of a motor vehicle including a flexible seating arrangement in accordance with the present invention illustrating the forward folding seat base of the second row seats folded into the fourth seating configuration.

FIGS. 7–9 illustrate a third seating configuration, which provides a third payload area 74 having a third load platform 73, which is coextensive with the first payload area 62 and its load platform 63, thereby increasing the payload capacity of the first floor 12. To accomplish this configuration the second row of seats 28 is slid forward on seat track 32 to a forward position. The third seat backs 34 and the third headrests 75 are folded forward to the first folded position and then the third seat base 76 is folded forward about a third hinged fastener 84 to a second folded position. This places the third seat base load surface 78 in a position co-planar with the first floor 12. The second row of seats 28 can be adjusted rearward in the upright passenger seating position to afford adequate leg room for comfortable passenger seating.

FIGS. 10–13 illustrate the fourth seating configuration, which provides a fourth payload area 82 having a fourth load platform 83, which is coextensive with the first and third payload areas 74, 62, thereby increasing the payload capacity that is co-planar with the first floor 12. To accomplish this configuration the second row of seats 28 is slid rearward on seat track 32 to a rearward position, and the second seat backs 36 and the second headrests 39 are folded forwardly to the first folded position. The latch mechanism 56 is released, and the second seat base 44 is folded forward about the second hinged fastener 80 to the second folded position. Next, the third seat backs 34 and the third headrests 75 are folded forward to the first folded position and then the third seat base 76 is folded forward about the third hinged fastener 84 to a second folded position between support members 50, 52 of a seat riser 30. This places the second and third seat base load surface 86, 78 in a position coplanar with the first floor 12. This configuration provides maximum payload capacity in a single plane, without the burden of removing and storing any seat assemblies.

Figure 15:
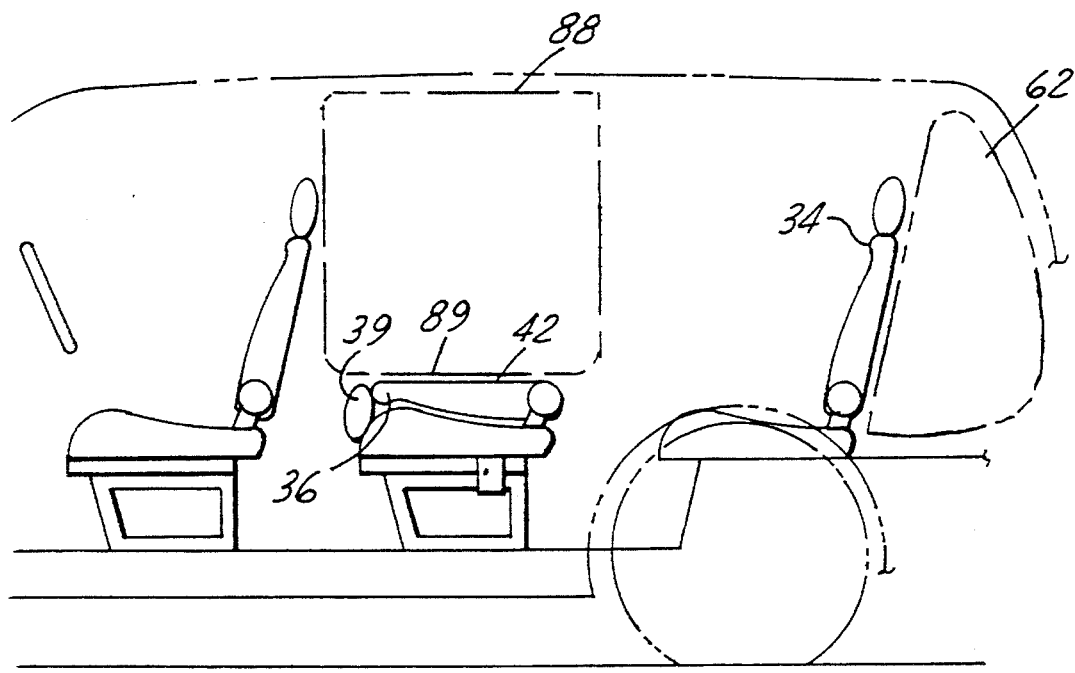
FIG. 15 is an elevational view of a motor vehicle including a flexible seating arrangement in accordance with the present invention arranged to present a fifth seating configuration.
Figure 14:
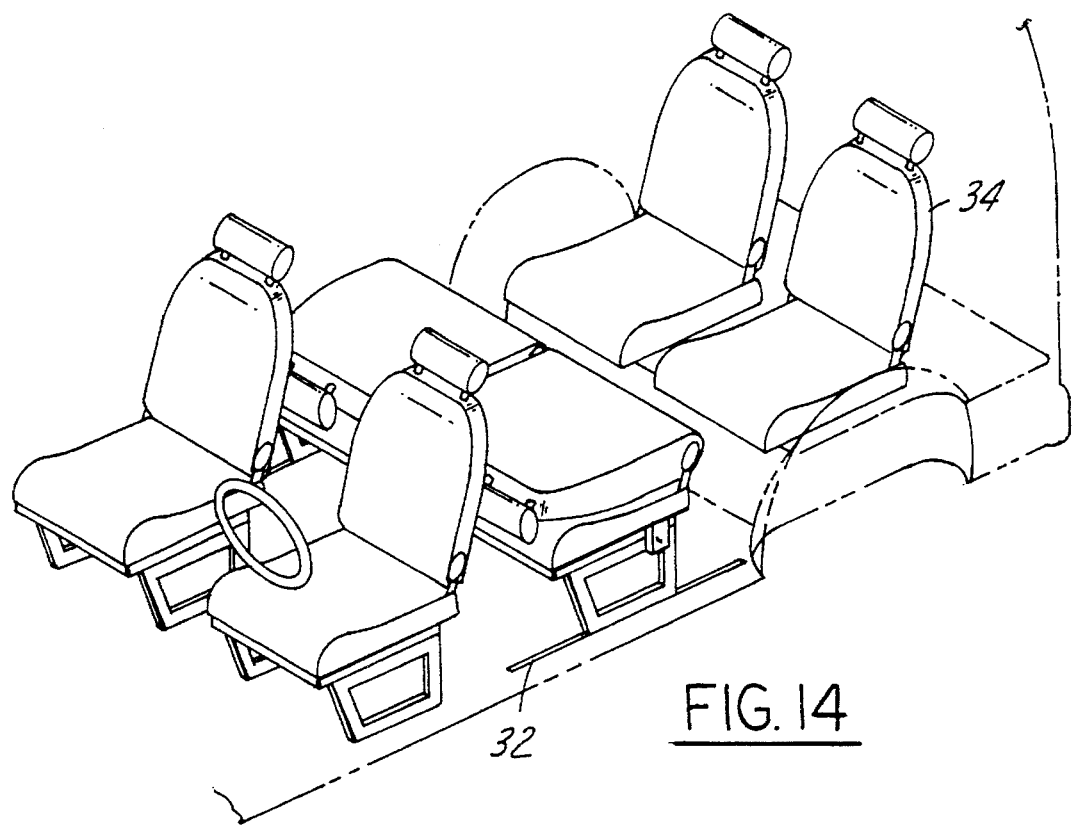
FIG. 14 is a perspective view of a motor vehicle including a flexible seating arrangement in accordance with the present invention arranged to present a fifth seating configuration.
Figure 16:
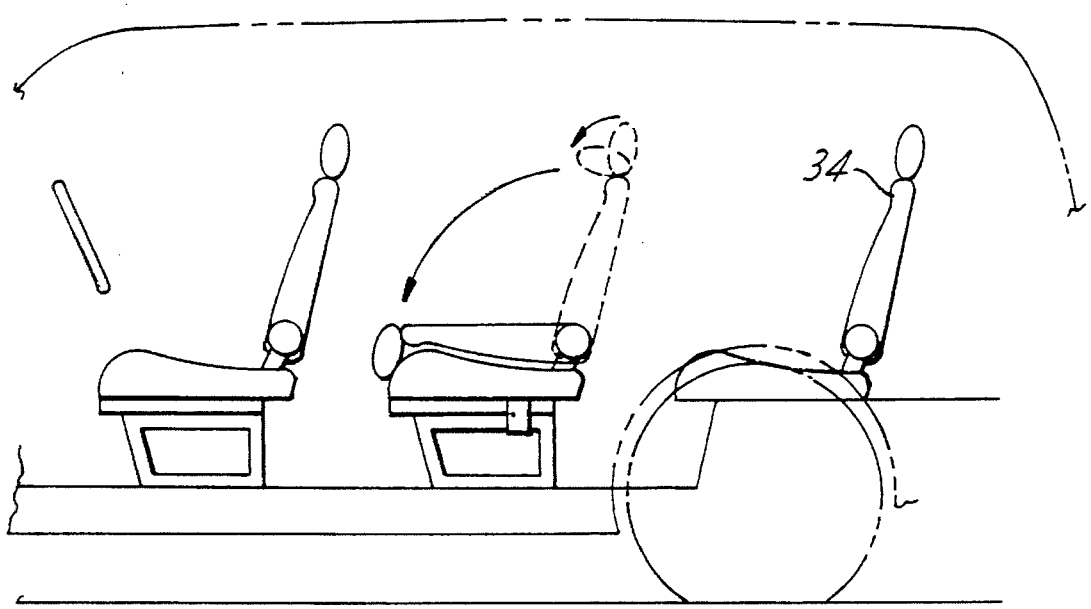
FIG. 16 is an elevational view of a motor vehicle including a flexible seating arrangement in accordance with the present invention being arranged to present a fifth seating configuration.

FIGS. 14–16 illustrate a fifth seating configuration, which provides a fifth unique payload area 88 having a fifth load platform 89, which may also be used for picnicking. This configuration is achieved by positioning third row of seats 34 in the upright passenger seating position, and the second seat backs 36 and the second headrests 39 are folded forward to the first folded position. In this position, the second seat back loading surfaces 42 presents the fifth load platform 89 is raised above the plane of the first floor 12. Load platform 89 is ideally suited for use by passengers seated in the third row of seats for a variety of activities in addition to carrying payload. The proximity of the platform to the third row of seats is adjustable forward and rearward to enhance passenger comfort.

Various other modifications and permutations of the present invention, no doubt, will occur to those skilled in the art. For example, by providing a fourth row of seats or a seat assembly with multiple independent seat backs, each being of the forwardly foldable type, even greater permutations are available. Therefore, it is the following claims, including all equivalents, which define the scope of the present invention.

I claim:

1. A seat arrangement for use in a motor vehicle having a longitudinal and a transverse axis, said vehicle including a first floor being raised over a rear axle of the motor vehicle and a second floor forward of said first floor, said arrangement comprising:

right and left seat tracks disposed on said second floor parallel to said longitudinal axis of said vehicle;

a slidable seat riser including right and left support members spaced parallel to one another and slidably engaged in said right and left seat tracks, respectively, and a transverse member interconnecting said support members;

a kickup interposed between the second floor and the first floor, said kickup having a lower edge contacting a rearward edge of the second floor and an upper edge contacting the forward edge of the first floor;

a first row of seats including a driver's and a navigator's seat disposed on the second floor, said navigator seat being of the forwardly folding type and having a first seat back having one face covered by a first loading surface and a first seat base;

a second row of seats, disposed immediately rearward of said first row of seats, said second row of seats being disposed on said seat riser, said second row of seats being of the forwardly folding type having a second seat back having one face covered by a second seat back loading surface, said second row of seats further including a second seat base having a forward edge being hingedly fastened to said riser, and one face covered by a second seat cushion loading surface; and a third row of seats, disposed immediately rearward of said second row of seats, said third row of seats being disposed on the raised first floor, said third row of seats being of the forwardly folding type having a third seat back having one face covered by a third seat back loading surface, said third row of seats further include a third seat base having one face covered by a third seat cushion loading surface and a forward edge being hingedly fastened to the upper edge of said kickup, wherein said right and left support members are spaced parallel to one another at a predetermined distance sufficient to receive said third row seats therebetween.

2. A passenger seating arrangement according to claim 1, wherein said seating arrangement is capable of at least five different configurations being defined by:

a first seating configuration wherein said firsts second and third seat backs are positioned in an upright passenger seating position presenting a first payload area co-planar with said first floor;

a second seating configuration wherein said navigator, second and third seat backs are folded forwardly to a first folded position substantially 90 degrees relative to said respective seat bases thereby adding a second payload area co-planar with said navigator, second and third seat back loading surfaces;

a third seating configuration wherein said third seat backs are folded forwardly to said first folded position and thereafter said third seat bases are folded forwardly substantially 180 degrees into a second folded position on the second floor, and said second row of seats are positioned in said upright passenger seating position over said third row of seats thereby presenting a third payload area co-planar with said first floor and coextensive with said first payload area;

a fourth seating configuration wherein said second seat backs are folded forwardly to said first folded position and thereafter said second seat bases are folded forwardly into said second folded position on the second floor and said third seat backs are folded forwardly to said first folded position and thereafter said third seat bases are folded forwardly into said second folded position on the second floor thereby presenting a fourth payload area co-planar with said first floor and coextensive with said first and third payload area; and a fifth seating configuration wherein the third seat backs are positioned in said upright passenger seating position and the second seat backs are folded forwardly to said first folded position presenting a fifth payload area co-planar with said second seat back loading surfaces.

3. A passenger seating arrangement according to claim 1, wherein said seat tracks extend substantially between said first and third rows of seats.

4. A passenger seating arrangement according to claim 1, wherein said seat tracks are flush mounted within said second floor.

5. A passenger seating arrangement according to claim 1, wherein said members of said seat riser have a predetermined fixed height.

6. A passenger seating arrangement according to claim 1, wherein at least one of said seat backs may further include a forwardly folding headrest disposed at an upper end of said seat backs when in the upright position.

7. A seat arrangement for use in a motor vehicle having a longitudinal and a transverse axis, said vehicle including a first floor being raised over a rear axle of the motor vehicle and a second floor forward of said first floor, said arrangement comprising:

right and left seat tracks disposed on said second floor parallel to said longitudinal axis of said vehicle;

a slidable seat riser including right and left support members slidably engaged in said right and left seat tracks, respectively, and a transverse member interconnecting said support members;

a kickup interposed between the second floor and the first floor, said kickup having a lower edge contacting a rearward edge of the second floor and an upper edge contacting the forward edge of the first floor;

a first row of seats including a driver's and a navigator's seat disposed on the second floor, said navigator seat being of the forwardly folding type and having a first seat back having one face covered by a first loading surface and a first seat base;

a second row of seats, disposed immediately rearward of said first row of seats, said second row of seats being disposed on said seat riser, said second row of seats being of the forwardly folding type having a second seat back having one face covered by a second seat back loading surface, said second row of seats further including a second seat base having a forward edge being hingedly fastened to said riser, and one face covered by a second seat cushion loading surface;

a third row of seats, disposed immediately rearward of said second row of seats, said third row of seats being disposed on the raised first floor, said third row of seats being of the forwardly folding type having a third seat back having one face covered by a third seat back loading surface, said third row of seats further include a third seat base having one face covered by a third seat cushion loading surface and a forward edge being hingedly fastened to the upper edge of said kickup;

said seating arrangement is capable of at least five different configurations being defined by:

a first seating configuration wherein said first, second and third seat backs are positioned in an upright passenger seating position presenting a first payload area co-planar with said first floor;

a second seating configuration wherein said navigator, second and third seat backs are folded forwardly to a first folded position substantially 90 degrees relative to said respective seat bases thereby adding a second payload area co-planar with said navigator, second and third seat back loading,surfaces;

a third seating configuration wherein said third seat backs are folded forwardly to said first folded position and thereafter said third seat bases are folded forwardly substantially 180 degrees into a second folded position on the second floor, and said second row of seats are positioned in said upright passenger seating position over said third row of seats thereby presenting a third payload area co-planar with said first floor and coextensive with said first payload area;

a fourth seating configuration wherein said second seat backs are folded forwardly to said first folded position and thereafter said second seat bases are folded forwardly into said second folded position on the second floor and said third seat backs are folded forwardly to said first folded position and thereafter said third seat bases are folded forwardly into said second folded position on the second floor thereby presenting a fourth payload area co-planar with said first floor and coextensive with said first and third payload area; and a fifth seating configuration wherein the third seat backs are positioned in said upright passenger seating position and the second seat backs are folded forwardly to said first folded position presenting a fifth payload area co-planar with said second seat back loading surfaces.

* * * * *